United States Patent
Yasumura

(10) Patent No.: US 6,956,749 B2
(45) Date of Patent: Oct. 18, 2005

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/471,200

(22) PCT Filed: Mar. 5, 2002

(86) PCT No.: PCT/JP02/02016

§ 371 (c)(1),
(2), (4) Date: Feb. 27, 2004

(87) PCT Pub. No.: WO02/073784

PCT Pub. Date: Sep. 19, 2002

(65) Prior Publication Data

US 2004/0141340 A1 Jul. 22, 2004

(30) Foreign Application Priority Data

Mar. 9, 2001 (JP) ............................... 2001-66618

(51) Int. Cl.[7] ........................................... H02M 3/335
(52) U.S. Cl. ............................ 363/19; 363/40; 363/97
(58) Field of Search ............................... 363/20, 21.01, 363/21.12, 84, 89, 95, 97, 18, 19, 39, 40

(56) References Cited

U.S. PATENT DOCUMENTS

| | | | |
|---|---|---|---|
| 4,041,355 A | 8/1977 | Onodera | ...................... 315/411 |
| 5,025,241 A * | 6/1991 | Bouillot et al. | .............. 336/100 |
| 5,278,748 A | 1/1994 | Kitajima | ....................... 363/56 |
| 5,706,184 A * | 1/1998 | Mizuta et al. | ............ 363/21.02 |
| 6,118,679 A * | 9/2000 | Smith | ........................... 363/70 |
| 6,411,528 B1 * | 6/2002 | Yasumura | ..................... 363/19 |
| 6,456,509 B1 * | 9/2002 | Yasumura | ................. 363/21.02 |
| 6,747,883 B2 * | 6/2004 | Yasumura | ..................... 363/98 |
| 2002/0080635 A1 * | 6/2002 | Yasumura | ..................... 363/97 |

FOREIGN PATENT DOCUMENTS

| | | | |
|---|---|---|---|
| EP | 0163235 | 12/1985 | ............ H04N 5/63 |
| EP | 0356661 | 3/1990 | .......... H04N 3/185 |
| EP | 1001520 | 5/2000 | .......... H02M 3/338 |

* cited by examiner

Primary Examiner—Adolf Berhane
(74) Attorney, Agent, or Firm—Jay H. Maioli

(57) ABSTRACT

A switching power supply circuit includes a converter transformer in which an output obtained by switching a direct current voltage of a converter through resonance is transmitted from the primary side to the secondary side. The switching power supply circuit further includes, on the secondary side of the converter transformer, a secondary step-up winding wound on a portion of a core together with a primary winding, and a low voltage secondary winding wound on another portion of the core. On the secondary side of the converter transformer, an alternating voltage obtained from the step-up winding is utilized to produce a direct current high voltage, and an alternating voltage obtained from the low voltage secondary winding is utilized to produce a direct current low voltage. Consequently, two different direct current outputs including the direct current high voltage and the direct current low voltage are obtained from the converter transformer.

9 Claims, 6 Drawing Sheets

SWITCHING POWER SUPPLY CIRCUIT

TECHNICAL FIELD

This invention relates to a switching power supply circuit suitable for applications typically to a color television receiver of a large size having a high resolution and a cathode ray tube display apparatus which includes a cathode ray tube and is used as a projector apparatus or a like apparatus.

BACKGROUND ART

As display apparatus which include a cathode ray tube (hereinafter referred to as CRT), display apparatus of a high resolution and a high picture quality ready for, for example, a television broadcast called HDTV (High Definition Television) or a digital television broadcast have been and are being popularized.

That one of the apparatus mentioned above which is ready for the HDTV uses a horizontal synchronizing signal having a frequency equal to twice that of ordinary television receivers in order to achieve a high resolution. The frequency of the horizontal synchronizing signal mentioned is 31.5 KHz, for example, for the NTSC system. Meanwhile, it is prescribed that an apparatus ready for the digital television broadcast has a horizontal synchronizing signal having a frequency of 33.75 KHz for the NTSC system. Further, the high anode voltage to be supplied to the anode electrode of the CRT in such video apparatus as mentioned above is equal to or higher than 30 KV.

In the present situation, popularization of those cathode ray tube display apparatus having a raised resolution and having a screen of an increased size is increasing in this manner. Thus, for example, as television receivers, those apparatus have been popularized significantly which are designed so as to convert, for the NTSC system, the frequency of the horizontal synchronizing signal into a double rate mode of 31.5 KHz and besides can receive also an HDTV broadcast.

Therefore, where a high voltage direct current (dc) output voltage is applied to the anode electrode of the CRT in such a television receiver as just described, the high dc output voltage varies, for example, between the frequencies of 31.5 KHz and 33.75 KHz of the horizontal synchronizing signal. The variation of the high dc output voltage varies the luminance or the raster size of a screen displayed on the CRT. Therefore, it is essentially required to stabilize a power supply circuit for producing the anode voltage described above.

Based on the background of the foregoing situations, various switching circuits suitable for applications to various cathode ray tube display apparatus have been proposed.

An exemplary one of switching power supply circuits for video apparatus is shown in a circuit diagram of FIG. 6.

In the circuit shown in FIG. 6, a switching converter for receiving as an input and interrupting a rectified smoothed voltage Ei is of the self-excited voltage resonance type which includes a switching element Q1 and performs a switching operation. The switching converter is further formed as a switching converter of the complex resonance type wherein complex resonance is caused by a secondary side parallel resonance circuit and a primary side voltage resonance circuit of a converter transformer PIT (Power Isolation Transformer). Further, the primary side winding of a fly-back transformer FBT is connected in parallel to the primary side winding of the PIT and is driven for switching by the switching element Q1.

In the power supply circuit shown in FIG. 6, a voltage doubler rectification circuit for an commercial alternating current (ac) power supply AC is formed from rectifying diodes Di1 and i2 and smoothing capacitors Ci1 and Ci2. The voltage doubler rectification circuit produces a rectified smoothed voltage Ei equal to twice an ac input voltage VAC to the smoothing capacitors Ci1 and Ci2 connected in series and supplies the rectified smoothed voltage Ei to the primary side voltage resonance type converter. By forming the voltage doubler rectification circuit in this manner, a rectified smoothed voltage Ei of a sufficient level for a case wherein the ac input voltage AC is of the 100 V type can be obtained.

The power supply circuit further includes an active clamp circuit 20 for the secondary side of the power isolation transformer PIT. The active clamp circuit 20 includes an auxiliary switching element Q2, a clamp capacitor CCL and a clamp diode DD2.

To a first control circuit 1A in this instance, a secondary side dc output voltage E01 is inputted as a detection voltage. The first control circuit 1A applies a bias voltage, which varies in response to a variation of the level of the inputted secondary side dc output voltage E01, to the gate of the auxiliary switching element Q2. In response to the bias voltage applied, the amount of current flowing to the clamp capacitor CCL varies, and thereupon, the amount of charging current to a secondary side parallel resonance capacitor C2 varies. Consequently, also the level of the alternating voltage (parallel resonance voltage) obtained by the secondary side parallel resonance circuit varies. Stabilization of the dc output voltage to be obtained on the secondary side of the power isolation transformer PIT is achieved in this manner.

A high voltage generation circuit 40 indicated by a rectangle of an alternate long and short dash line is formed from a fly-back transformer FBT and a high voltage rectification circuit. The high voltage generation circuit 40 operates such that current induced in step-up windings NHV1 to NHV5 with excitation current flowing through a primary side winding N0 of the fly-back transformer FBT is rectified by five half-wave rectification circuits to charge a smoothing capacitor C0HV. As a result of the operation, a dc high voltage EHV of a level equal to approximately five times the induced voltage induced in each of the step-up windings NHV1 to NHV5 is obtained across the smoothing capacitor C0HV.

Further, a series circuit of resistors R1 and R2 is connected in parallel across the smoothing capacitor C0HV, and a voltage divided by the resistors R1 and R2 is inputted to a second control circuit 1B.

The second control circuit 1B outputs a control voltage, which corresponds, for example, to a voltage level variation of the dc high voltage EHV, as a control signal.

The level of control current to be supplied to a control winding NC is varied in response to the control voltage to variably control the inductance LB of a driving winding NB wound on an orthogonal control transformer PRT (Power Regulation Transformer). By the variable control of the inductance LB of the driving winding NB, the resonance condition of a resonance circuit of a self-excited oscillation driving circuit formed including the inductance LB of the driving winding NB varies. The variation of the resonance condition acts to vary the switching frequency of the switching element Q1, and this action fixes the dc output voltage to be outputted from the secondary side.

Incidentally, the circuit shown in FIG. 6 includes the power isolation transformer PIT and the fly-back transformer FBT, which are transformers of a large size, and requires a considerably large mounting area. Therefore, it is demanded to miniaturize the circuit.

DISCLOSURE OF INVENTION

Thus, according to the present invention, a switching power supply circuit is configured in the following manner taking the subject described above into consideration.

In particular, the switching power supply circuit includes switching means having a main switching element for interrupting and outputting a dc input voltage inputted thereto, and a high voltage generating transformer including a high voltage primary winding and a secondary side step-up winding wound on a portion of a core and at least a secondary side low voltage winding wound on the other portion of the core.

The switching power supply circuit further includes a primary side resonance capacitor for cooperating at least with the high voltage primary winding of the high voltage generating transformer to form a primary side resonance circuit, and a secondary side parallel resonance circuit formed from a secondary side parallel resonance capacitor connected in parallel to the secondary side low voltage winding.

The switching power supply circuit further includes dc low voltage production means formed including the secondary side parallel resonance circuit for performing a half-wave rectification operation for a voltage within positive periods of an alternating voltage obtained from the secondary side low voltage winding to obtain a dc low voltage, and dc high voltage production means for rectifying a high voltage obtained by the secondary side step-up winding to obtain a dc high voltage.

The switching power supply circuit further includes first fixed voltage control means for performing fixed voltage control for a level of the voltage to be produced by the dc high voltage production means.

The high voltage generating transformer includes a low voltage primary winding wound on the other portion of the core together with the secondary side low voltage winding and connected in parallel to the high voltage primary winding.

Accordingly, as a general configuration of the switching power supply circuit, it includes a primary side voltage resonance type switching converter, a high voltage generating transformer for transmitting a switching output of the primary side voltage resonance type switching converter to the secondary side, a rectification circuit system formed as dc high voltage production means on the secondary side of the high voltage generating transformer, and another rectification circuit system formed as dc low voltage production means on the secondary side of the high voltage generating transformer. Here, in the rectification circuit system of the dc low voltage production means, a secondary side parallel resonance circuit is formed. Consequently, a complex resonance type switching converter is formed in the power supply circuit as a whole.

In such a circuit configuration as just described, in order to obtain a dc high voltage and a dc low voltage using a single switching power supply circuit, power is transmitted from the primary side to the secondary side by the high voltage generating transformer. In other words, there is no necessity to provide two large size transformers including a high voltage generating transformer and a power insulation transformer, and the power insulation transformer can be omitted.

BEST MODE FOR CARRYING OUT THE INVENTION

In the following, switching power supply circuits of embodiments of the present invention are successively described. The switching power supply circuits of the embodiments described below have a basic configuration as a complex resonance type switching converter wherein a voltage resonance type converter is provided on the primary side while a parallel resonance circuit is provided on the secondary side. Further, the power supply circuits shown in the figures are incorporated in a television receiver, a monitor display apparatus, a projector apparatus or a like apparatus which includes a CRT (cathode ray tube) as a display device.

Figure 1:
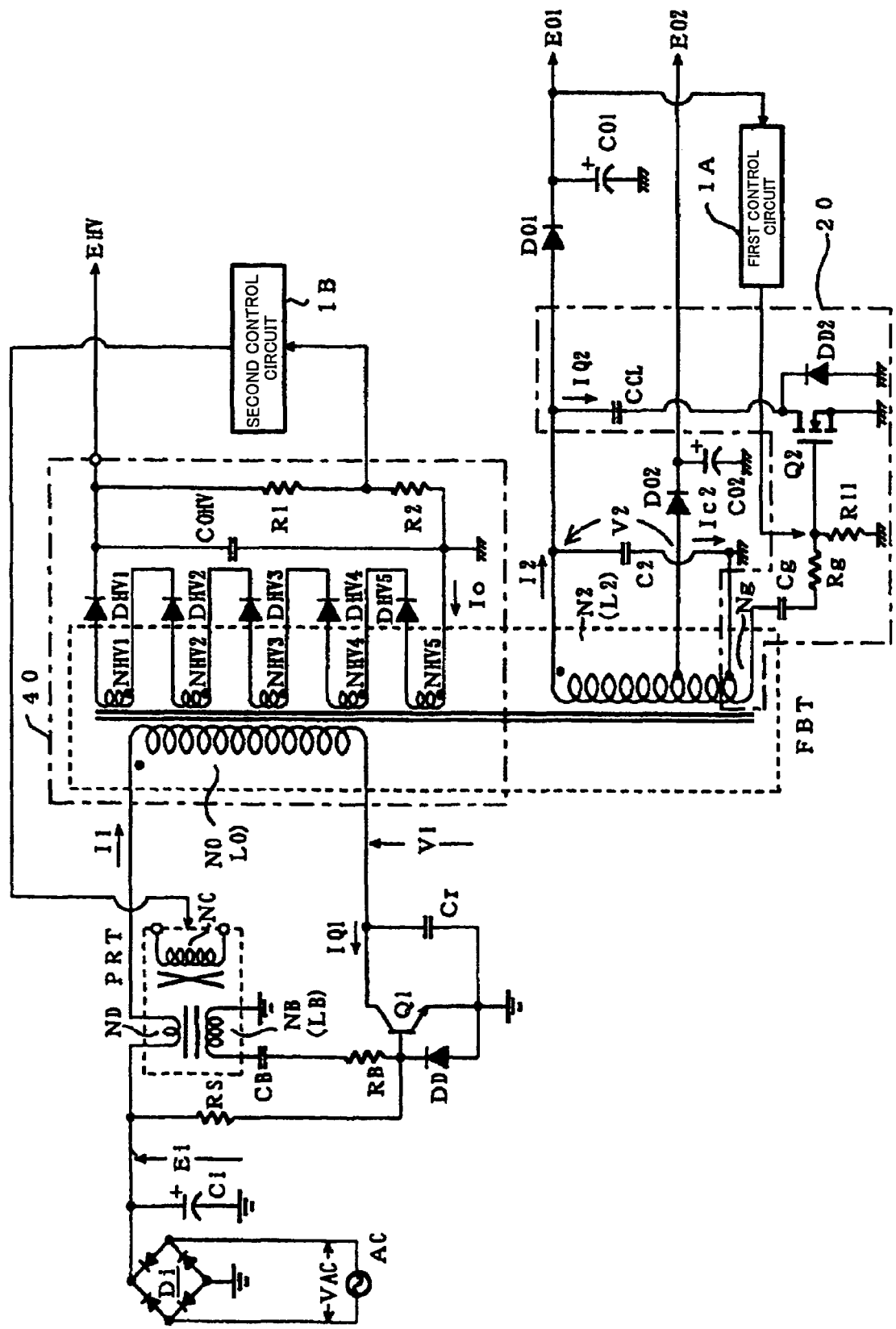
FIG. 1 is a circuit diagram showing an example of a configuration of a switching power supply circuit as a first embodiment of the present invention.

FIG. 1 shows an example of a configuration of a switching power supply circuit as a first embodiment of the present invention.

The power supply circuit shown in FIG. 1 includes a full-wave rectification smoothing circuit as a rectification smoothing circuit for receiving a commercial ac power supply (ac input voltage VAC) as an input thereto to obtain a dc input voltage. The full-wave rectification smoothing circuit includes a bridge rectification circuit Di and a smoothing capacitor Ci. The full-wave rectification smoothing circuit produces a rectified smoothed voltage (dc input voltage) Ei having a level corresponding to the ac input voltage VAC as a voltage across the smoothing capacitor Ci.

The switching converter of the voltage resonance type provided in the power supply circuit adopts a self-excitation configuration including a switching element Q1. In this instance, a bipolar transistor of a high voltage withstanding type such as a BJT (Bipolar Junction Transistor) is adopted for the switching element Q1.

A series resonance circuit for self-excited oscillation driving is connected between the base of the switching element Q1 and the primary side ground. The series resonance circuit is a series connection circuit of a driving winding NB, a resonance capacitor CB and a base current limiting resistor RB.

The base of the switching element Q1 is connected also to the positive electrode side of the smoothing capacitor Ci (rectified smoothed voltage Ei) through a starting resistor RS so that base current upon starting is obtained from the rectification smoothing line.

A clamp diode DD is connected between the base of the switching element Q1 and the negative electrode (primary side ground) of the smoothing capacitor Ci so as to form a path for clamp current which flows when the switching element Q1 is off. The collector of the switching element Q1 is connected to a winding ending end portion of a primary winding No of a fly-back transformer FBT while the emitter of the switching element Q1 is grounded.

A parallel resonance capacitor Cr is connected in parallel between the collector and the emitter of the switching element Q1. The parallel resonance capacitor Cr has a capacitance which cooperates with a leakage inductance Lo of the primary winding No side of the fly-back transformer FBT hereinafter described to form a primary side parallel resonance circuit of the voltage resonance type converter. A voltage V1 across the parallel resonance capacitor Cr when the switching element Q1 is off actually exhibits a pulse waveform like a sine wave due to an action of the parallel resonance circuit. Consequently, an operation of the voltage resonance type is obtained.

The orthogonal control transformer PRT shown in FIG. 1 is a saturable reactor having a resonance current detection winding ND, a driving winding NB and a control winding NC wound thereon. The orthogonal control transformer PRT is provided to drive the switching element Q1 and provided for constant voltage control of the switching frequency control type.

The orthogonal control transformer PRT is structured such that, though not shown in the drawings, two cores having four magnetic legs are joined together at ends of the magnetic legs thereof to form a solid core. The resonance current detection winding ND and the driving winding NB are wound in the same winding direction on predetermined two ones of the magnetic legs of the solid core. Further, the control winding NC is wound in a direction orthogonal to that of the resonance current detection winding ND and the driving winding NB.

In this instance, the resonance current detection winding ND of the orthogonal control transformer PRT is interposed in series between the positive electrode (rectified smoothed voltage Ei line) of the smoothing capacitor Ci and the primary winding No of the fly-back transformer FBT so that the switching output of the switching element Q1 is transmitted to the resonance current detection winding ND. In the orthogonal control transformer PRT, a switching output obtained in the resonance current detection winding ND is induced in the driving winding NB through the transformer coupling so that an alternating voltage is generated as a drive voltage in the driving winding NB. The drive voltage is outputted from the series resonance circuit (NB, CB), which form the self-excited oscillation driving circuit, as drive current to the base of the switching element Q1 through the base current limiting resistor RB. Consequently, the switching element Q1 performs a switching operation with a switching frequency determined by the resonance frequency of the series resonance circuit.

The fly-back transformer FBT is provided to transmit the switching output of the switching element Q1 from the primary side to the secondary side to produce a high alternating voltage for obtaining a high dc voltage for the anode voltage on the secondary side. In the present embodiment, however, the fly-back transformer FBT is configured also so as to produce a low alternating voltage for obtaining, for example, a low secondary side dc output voltage for various circuits on the secondary side of the fly-back transformer FBT.

To this end, the fly-back transformer FBT in the present embodiment has the step-up windings NHV1 to NHV5 as secondary windings wound thereon and besides has a low voltage secondary winding N2 wound thereon as seen in FIG. 1.

Further, as regard a circuit configuration of the secondary side of the fly-back transformer FBT, the high voltage generation circuit 40 side which includes the step-up windings NHV1 to NHV5 has such a configuration as described below.

In particular, the high voltage generation circuit 40 indicated by a rectangle of an alternate long and short dash line in FIG. 1 is formed from the fly-back transformer FBT and a high voltage rectification circuit. The high voltage generation circuit 40 steps up the voltage inputted to the primary winding No of the fly-back transformer FBT to produce a dc high voltage corresponding, for example, to an anode voltage level of a CRT.

To this end, four to five step-up windings NHV are wound divisionally by so-called slit winding or interlayer winding in such a manner as hereinafter described on the secondary side of the fly-back transformer FBT.

In this instance, the primary side winding NO and the step-up windings NHV are wound such that they are coupled closely to each other. It is to be noted that the coupling coefficient k between the primary side winding NO and the step-up windings NHV is set to $k \geq 0.95$.

A stepped up voltage is obtained on the secondary side of the fly-back transformer FBT. The stepped up voltage is obtained by stepping up a voltage generated in the primary side winding N0 in accordance with the ratio in winding number (NHV/N0) between the step-up windings NHV and the primary side winding N0.

In the power supply circuit shown in FIG. 1, the five step-up windings NHV1, NHV2, NHV3, NHV4 and NHV5 are wound in an individually independent state on the secondary side of the fly-back transformer FBT. The anodes of high voltage rectifying diodes DHV1, DHV2, DHV3, DHV4 and DHV5 are connected to winding ending ends of the step-up windings NHV1 to NHV5, respectively. The cathode of the high voltage rectifying diode DHV1 is connected to the positive terminal of a smoothing capacitor C0HV, and the cathodes of the other high voltage rectifying diodes DHV2 to DHV5 are connected to winding beginning ends of the step-up windings NHV1 to NHV4, respectively.

In particular, a half-wave rectification circuit of the so-called multi-singular type wherein five half-wave rectification circuits are connected in series is connected to the secondary side of the fly-back transformer FBT. The five half-wave rectification circuits include the [step-up winding NHV1 and high voltage rectifying diode DHV1], [step-up winding NHV2 and high voltage rectifying diode DHV2], [step-up winding NHV3 and high voltage rectifying diode DHV3], [step-up winding NHV4 and high voltage rectifying diode DHV4], and [step-up winding NHV5 and high voltage rectifying diode DHV5].

Accordingly, an operation of the five half-wave rectification circuits of rectifying the current induced in the step-up windings NHV1 to NHV5 to charge the smoothing capacitor C0HV is performed on the secondary side of the fly-back transformer FBT. Thus, the dc high voltage EHV of a level corresponding to approximately five times the induced voltage induced in each of the step-up windings NHV1 to NHV5 is obtained across the smoothing capacitor C0HV. The dc high voltage EHV is utilized as the anode voltage of the CRT. It is to be noted that a stabilization operation for the dc high voltage EHV is hereinafter described.

Meanwhile, the low voltage secondary winding N2 side of the fly-back transformer FBT has the following configuration.

In this instance, the winding beginning end of the secondary winding N2 is connected to the anode of a rectifying diode D01, and the winding ending end of the secondary winding N2 is connected to the secondary side ground. The secondary side dc output voltage E01 is obtained from a half-wave rectification smoothing circuit formed from the rectifying diode D01 and a smoothing capacitor C01. It is to be noted that the secondary side dc output voltage E01 is, for example, 135 V and is used for a horizontal deflection circuit system. Further, the secondary side dc output voltage E01 is supplied also as a detection voltage to the first control circuit 1A.

Further, in this instance, a tap is provided for the secondary winding N2 as shown in FIG. 1. A half-wave rectification circuit formed from a rectifying diode D02 and a smoothing capacitor C02 is connected in such a manner as shown in FIG. 1 to the tap output to produce a secondary side dc output voltage E02 which is lower than the secondary side dc output voltage E01 and is, for example, 15 V. The secondary side dc output voltage E02 is used, for example, for a vertical deflection circuit system. Further, in this instance, the secondary side dc output voltage E02 is supplied also as an operating power supply to the first control circuit 1A and the second control circuit 1B.

It is to be noted that the fly-back transformer FBT may actually be configured otherwise such that it produces a low secondary side dc output voltage of a required level to be supplied to various other circuit systems. For example, the fly-back transformer FBT may be configured so as to produce secondary side dc output voltages for a video output circuit system (200 V), a CRT heater circuit system (7.5 V), an audio output circuit system (24 V) and so forth.

A secondary side parallel resonance capacitor C2 is connected to the low voltage secondary winding N2. In this instance, a secondary side parallel resonance circuit is formed from the leakage inductance L2 of the secondary winding N2 and the capacitance of the secondary side parallel resonance capacitor C2. Thus, the alternating voltage induced on the secondary side becomes a resonance voltage, and a voltage resonance operation is obtained on the secondary side.

In particular, the power supply circuit of the present embodiment is formed as a switching converter of the complex resonance type which includes parallel resonance circuits provided on the primary side and the secondary side of the fly-back transformer FBT. The parallel resonance circuit on the primary side is provided to make the switching operation as an operation of the voltage resonance type. The parallel resonance circuit on the secondary side is provided to obtain a voltage resonance operation.

Here, in the fly-back transformer FBT in the present embodiment, in order to obtain a fly-back operation to obtain a dc high voltage, it is necessary for the primary side and the secondary side to be coupled to each other by close coupling. Meanwhile, in order to obtain an operation as a switching converter of the complex resonance type described above, it is necessary for the primary side and the secondary side to be coupled by loose coupling.

Accordingly, the fly-back transformer FBT in the present embodiment is so structured that a close coupling state between the primary side winding N0 and the step-up windings NHV1 to NHV5 and a loose coupling state between the primary side winding N0 and the secondary winding N2 are obtained. It is to be noted that the structure of the fly-back transformer FBT is hereinafter described.

Further, on the secondary side, the active clamp circuit 20 is provided for the secondary side parallel resonance circuit.

The active clamp circuit 20 includes an auxiliary switching element Q2, a clamp capacitor CCL, and a clamp diode DD2. In this instance, a MOS-FET is selected for the auxiliary switching element Q2. Meanwhile, a body diode built in the auxiliary switching element Q2 in the form of a MOS-FET is used for the clamp diode DD2.

Meanwhile, a driving circuit system for driving the auxiliary switching element Q2 is formed from an LCR series resonance circuit formed from a capacitor Cg and a resistor Rg are connected to a driving winding Ng wound on the secondary side in such a manner as to be wound contiguously to the secondary winding N2. In this instance, a bias resistor R11 is interposed between the gate of the auxiliary switching element Q2 and the secondary side ground.

The drain of the auxiliary switching element Q2 is connected to the winding beginning end of the secondary winding N2 through the clamp capacitor CCL. The drain of the auxiliary switching element Q2 is grounded to the secondary side ground. Further, the clamp diode DD2 is connected at the anode thereof to the drain of the auxiliary switching element Q2 and connected at the cathode thereof to the source of the auxiliary switching element Q2 to form a path for clamp current which flows within an off period of the auxiliary switching element Q2.

In this manner, in the active clamp circuit 20 in the present embodiment, the clamp capacitor CCL is connected in series to the switching circuit formed from the auxiliary switching element Q2 and the clamp diode DD2. The circuit formed in this manner is further connected in parallel to the secondary side parallel resonance circuit formed from the secondary winding N2 and the secondary side parallel resonance capacitor C2.

The power supply circuit of the present embodiment performs a stabilization operation in the following manner.

The first control circuit 1A applies a dc control voltage of a level varied in response to a variation of the secondary side dc output voltage E01. The control voltage varies the gate threshold voltage (bias) to the auxiliary switching element Q2 and thereby varies the on period of the auxiliary switching element Q2. In short, PWM control of the continuity angle is performed.

In the circuit configuration shown in FIG. 1, when the switching circuit (Q2 and DD2) is rendered conducting and current flows to the clamp capacitor CCL within an on period, current to flow to and charge the secondary side parallel resonance capacitor C2 flows to the clamp capacitor CCL. A peak level of the secondary side parallel resonance voltage V2 which is obtained across the secondary side parallel resonance capacitor C2 as a result of the operation just described is suppressed and clamped.

Accordingly, if the continuity angle of the auxiliary switching element Q2 is variably controlled to vary the amount of current to flow to the clamp capacitor CCL, then the amount of charging current of the secondary side parallel resonance capacitor C2 varies, and also the level of the secondary side parallel resonance voltage V2 varies. As the level of the secondary side parallel resonance voltage V2 varies in this manner, the level of the rectified current to flow to the smoothing capacitor C01 varies, and as a result, an operation of variably controlling the level of the secondary side dc output voltage E01 is obtained. Then, stabilization of the low secondary side dc output voltage is achieved by the operation just described.

A series connection circuit of the resistors R1 and R2 is connected in parallel to the smoothing capacitor C0HV from which the dc high voltage EHV is obtained. The voltage dividing point between the resistors R1 and R2 is connected to the second control circuit 1B. In other words, in the present embodiment, a voltage level obtained by dividing the dc high voltage EHV by means of the resistors R1 and R2 is-inputted as a detection voltage to the second control circuit 1B.

The second control circuit 1B varies the level of the control current (dc current) to flow to the control winding NC in response to a variation of the dc high voltage EHV to variably control the inductance LB of the driving winding NB wound on the orthogonal control transformer PRT. This varies the resonance condition of the series resonance circuit in the self excited oscillation drive circuit for the switching element Q1 which is formed including the inductance LB of the driving winding NB. This makes an operation of varying the switching frequency of the switching element Q1, and this operation varies the energy to be transmitted from the primary side to the secondary side in the fly-back transformer FBT. Consequently, the dc high voltage EHV is controlled so that a required fixed level thereof may be maintained. In short, in the circuit shown in FIG. 1, stabilization of the dc high voltage EHV is achieved by the switching frequency control system.

An example of a structure of the fly-back transformer FBT in the present embodiment is described with reference to a sectional view of FIG. 3.

Figure 3:
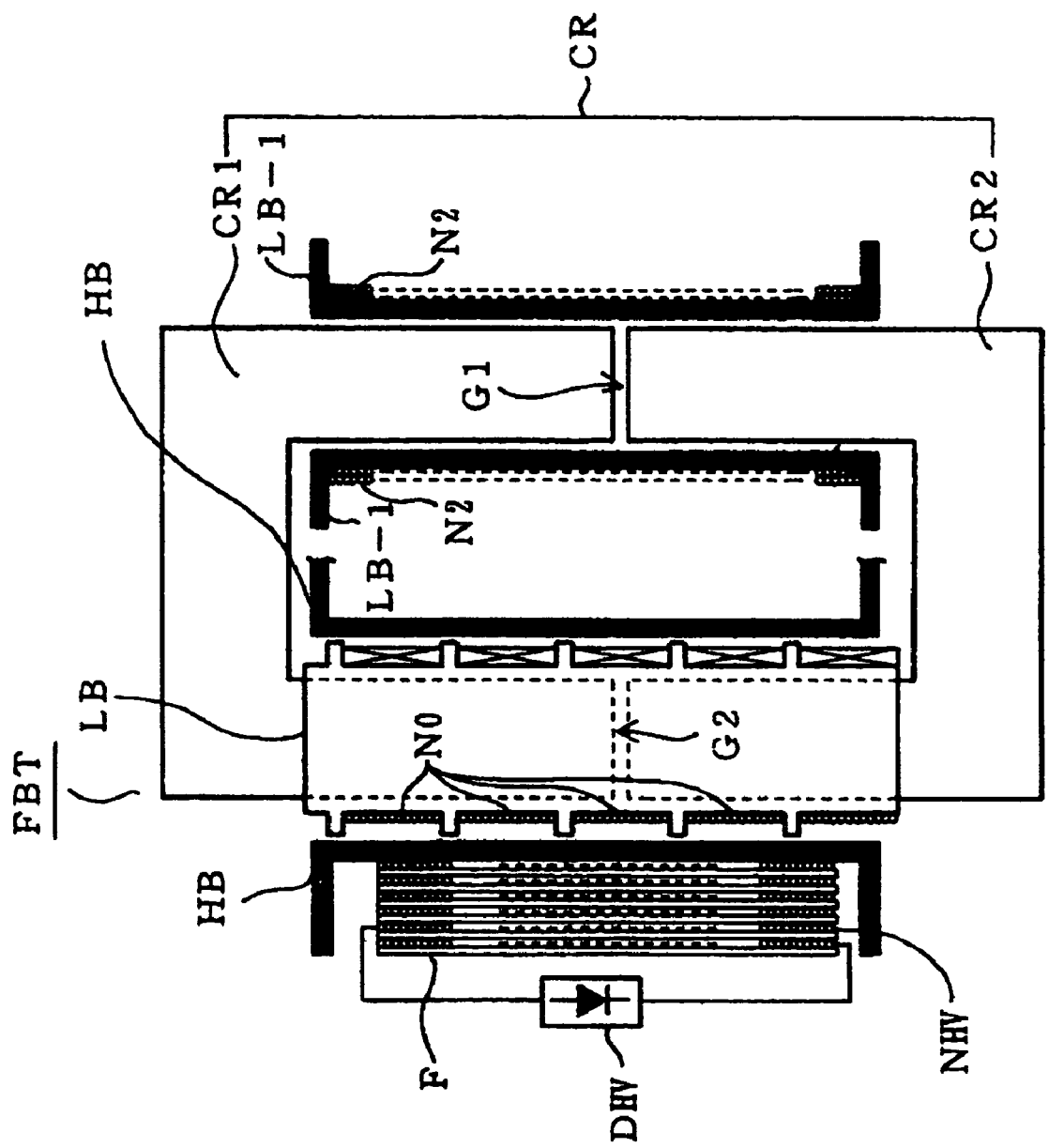
FIG. 3 is a sectional view showing an example of a structure of a fly-back transformer provided in the power supply circuit shown in FIG. 1.

In the fly-back transformer FBT shown in FIG. 3, two U-shaped cores CR1 and CR2 made of, for example, a ferrite material are combined such that magnetic legs thereof are opposed to each other to form a U-U-shaped core CR. Gaps G1 and G2 are provided between the opposing portions of the ends of the magnetic legs of the U-shaped core CR1 and the ends of the magnetic legs of the U-shaped core CR2.

A low voltage winding bobbin LB on which the primary winding No is round is attached such that one of the magnetic legs of the U-U-shaped core CR extends therethrough as seen in FIG. 3. A high voltage winding bobbin HB on which the step-up windings NHV1 to NHV5 are wound is mounted on the outer side of the low voltage winding bobbin LB. Consequently, a structure wherein the primary winding No and the step-up windings NHV1 to NHV5 are wound divisionally is obtained. According to the structure just described, the primary winding No and the step-up windings NHV1 to NHV5 are wound by so-called "coaxial winding" on the same magnetic leg. Therefore, a closely coupled state is obtained as a coupling state of the primary winding No and the step-up windings NHV1 to NHV5 among them. Actually, a closely coupled state having, for example, a coupling coefficient k=0.98 can be obtained.

Here, as the step-up windings NHV to be mounted on the high voltage winding bobbin HB, for example, a plurality of step-up windings NHV1 to NHV5 must be wound in an isolated state from one another. Therefore, the step-up windings NHV are wound by interlayer winding wherein an interlayer film F is interposed between each adjacent ones of winding layers of the step-up windings NHV1 to NHV5 each obtained from a plurality of winding turns.

After the step-up windings NHV1 to NHV5 are wound in such a manner as described above, the high voltage rectifying diodes DHV1 to DHV5 are connected to the step-up windings NHV1 to NHV5, respectively.

Meanwhile, another low voltage winding bobbin LB-1 is mounted on the other magnetic leg such that the magnetic leg extends therethrough. The secondary winding N2 is wound on the low voltage winding bobbin LB-1.

Where the secondary winding N2 is wound in this manner, the primary winding No and the secondary winding N2 are wound on the magnetic legs different from each other. Consequently, a loose coupling is obtained as a coupling state between the primary winding No and the secondary winding N2. Actually, a loose coupling state having a coupling coefficient k of approximately k=0.55 was obtained successfully.

It is to be noted that, while, in the circuit shown in FIG. 1, the driving winding Ng is wound contiguously to an end portion of the secondary winding N2, in FIG. 3, the windings are not shown. Actually, however, the driving winding Ng is wound on the bobbin together with the secondary winding N2.

The fly-back transformer FBT in the present embodiment is not limited to that of the configuration shown in FIG. 3, but may be modified as occasion demands. For example, as regards the high voltage generation circuit 40, the fly-back transformer FBT in the present embodiment may be configured by adopting a structure based on so-called slit winding as a basic structure and winding the secondary winding N2 in such a manner as seen in FIG. 3.

Figure 6:
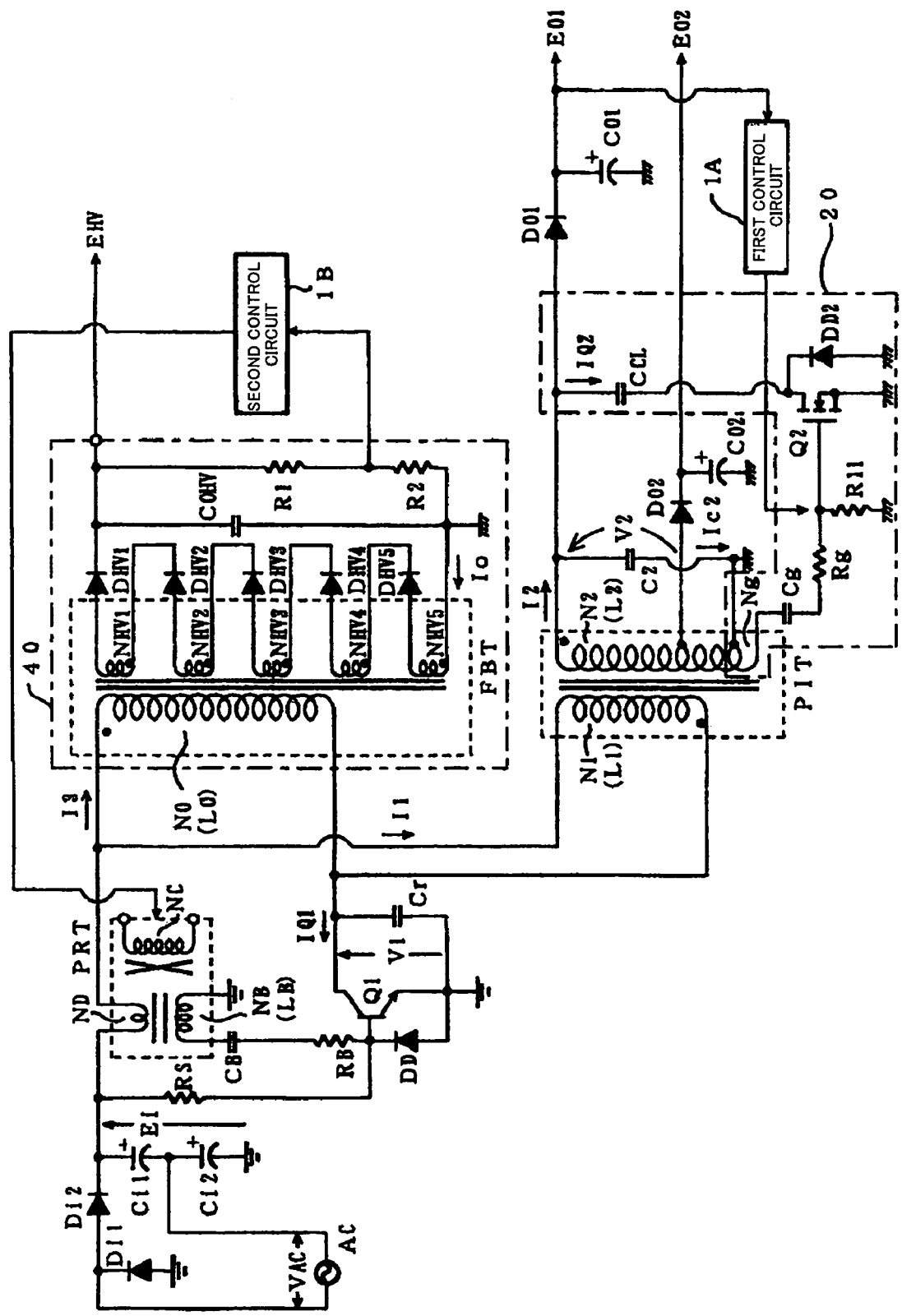
FIG. 6 is a circuit diagram showing a configuration of a switching power supply circuit as a prior art circuit.

Here, specifications of essential part of the circuit shown in FIG. 1 as the first embodiment are indicated in comparison with those of the power supply circuit shown in FIG. 6 as a prior art apparatus. It is to be noted that the specifications given below apply to a configuration for conditions that the load power Po of the low secondary side dc output voltage E01 is 150 W to 100 W and the load power PHV of the dc high voltage EHV is 68 W (31.5 kV×2.15 mA).

In the power isolation transformer PIT adopted in the circuit shown in FIG. 6, an EE-type core called EE-40 type was used wherein the gap length G=1 mm, the primary winding N1=130 T, and the secondary winding N2= 100 T. In the fly-back transformer FBT adopted in the circuit shown in FIG. 6, the gap length G=0.4 mm×2, the primary winding No=70 T, and the step-up windings NHV1 to NHV5=530 T.

As constants of major parts, the parallel resonance capacitor Cr=2,200 pF, the clamp capacitor CCL=0.15 F, a second side parallel resonance capacitor C2=0.01 F, and a primary side series resonance capacitor CB= 0.018 F were selected. The control range of the switching frequency was set to 80 KHz to 120 KHz.

In contrast, in the power supply circuit of the present embodiment shown in FIG. 1, the primary winding No=55 T and the low voltage secondary winding N2=60 T are wound in the fly-back transformer FBT.

For the switching element Q1 and the auxiliary switching element Q2 in the present embodiment, a switching element which withstands 800 V is selected for the AC 100 V system, and another switching element which withstands 1,500 V is selected for the AC 200 V system.

Figure 2:
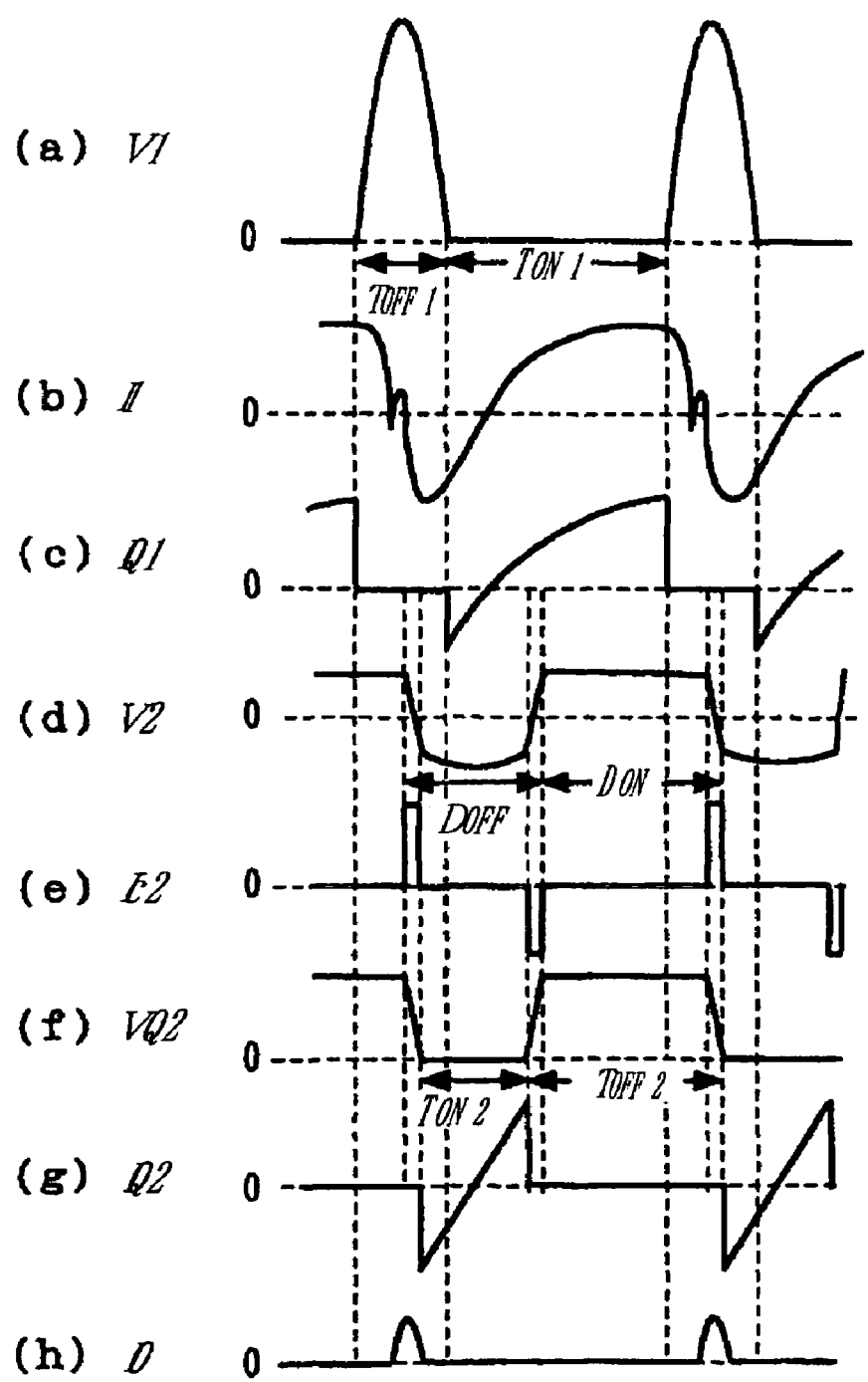
FIG. 2 is a waveform diagram illustrating operation of essential part of the power supply circuit shown in FIG. 1.

A waveform diagram of FIG. 2 illustrates operation of essential part of the power supply circuit described above with reference to FIG. 1.

The voltage V1 obtained across the primary side parallel resonance capacitor Cr has a waveform suitable for a switching timing of the switching element Q1 of the primary side voltage resonance type converter as seen in (a) of FIG. 2. In particular, a waveform is obtained wherein a voltage resonance pulse is obtained within a period TOFF1 within which the switching element Q1 is off and the 0 level is obtained within another period TON1 within which the switching element Q1 is on.

Further, the collector current IQ1 which flows to the switching element Q1 at this time has such a waveform as seen in (c) of FIG. 2. In particular, first upon starting of the period TON1, clamp current of the negative polarity flows through the clamp diode DD, the base of the switching element Q1 and the collector of the switching element Q1. Thereafter, the polarity of the clamp current is reversed to the positive polarity and the clamp current of the positive polarity flows along the drain and the source of the switching element Q1. On the other hand, within the period TOFF1, the clamp current exhibits the 0 level.

Meanwhile, the winding current I1 obtained in the primary winding No by such a switching operation of the primary side as described above has a waveform of a substantially sine wave in such a manner as seen in (b) of FIG. 2. The waveform exhibits a cycle of reversals between the positive and the negative for each one switching period.

Operation of the secondary side of the fly-back transformer FBT is illustrated in (d) to (h) of FIG. 2.

First, the secondary side parallel resonance voltage V2 obtained across the secondary side parallel resonance capacitor C2 which cooperates with the low voltage secondary winding N2 to form the secondary side parallel resonance circuit is illustrated in (d) of FIG. 2. In particular, the secondary side parallel resonance voltage V2 has a waveform wherein it is clamped at the level of the secondary side dc output voltage E01 within a period DON within which the secondary side rectifying diode D01 is conducting and rectification current flows. However, the secondary side parallel resonance voltage V2 has a peak level in the negative polarity direction within another period DOFF within which the secondary side rectifying diode D01 is non-conducting.

The switching timing of the switching circuit (Q2 and D02, this similarly applies to the following description) of the active clamp circuit 20 connected in parallel to the secondary side parallel resonance circuit is indicated by an clamp current IQ2 in (g) of FIG. 2.

As seen from (g) of FIG. 2, the switching circuit conducts and exhibits an on state within a period TON2 within the period DOFF but does not conduct and exhibits an off state within the other period TOFF2 other than the period TON2. The period TOFF2 here includes the period DON. In other words, the switching circuit of the active clamp circuit 20 and the rectifying diode D01 perform on/off operations at substantially alternate timings.

Here, within the front half of the period TON2, the clamp current IQ2 exhibits a sawtooth waveform of the negative polarity as current flows along the path of the clamp diode DD2, clamp capacitor CCL and low voltage secondary winding N2. Within the rear half of the period TON2, the current reverses so that it now exhibits the positive polarity, and flows along the path of the secondary winding N2, the drain of the auxiliary switching element Q2, and the source of the auxiliary switching element Q2. Then, within the period TOFF2 within which the switching circuit is off, the clamp current IQ2 exhibits a waveform wherein the 0 level is maintained.

Further, since the switching circuit performs on/off operations in such a manner as described above, the clamp circuit voltage VQ2 obtained across the switching circuit exhibits such a waveform as shown in (f) of FIG. 2. In particular, the waveform has the 0 level within the period TON2, but maintains a predetermined level of the positive polarity within the period TOFF2.

Since the active clamp circuit 20 performs on/off operations at such timings as described above, within the period TON2, almost all of current to originally flow to the secondary side parallel resonance capacitor C2 flows to the switching circuit. Therefore, the resonance current IC2 which flows to the secondary side parallel resonance capacitor C2 flows in the form of a pulse only within short periods of time upon starting and ending of the period DOFF in such a manner as seen in (e) of FIG. 2. The amount of current to flow into the secondary side parallel resonance capacitor C2 to charge the same is reduced in such a manner as described above. Consequently, the peak level of the secondary side parallel resonance voltage V2 illustrated in (d) of FIG. 2 is suppressed within the period DOFF. Then, since the continuity angle control of the auxiliary switching element Q2 is performed by the operation of the first control circuit 1A to variably control the period TON2, also the period within which the resonance current IC2 flows is varied. As a result, stabilization of the low secondary side dc output voltage is achieved by the action described above.

The rectified current Io which flows in the high voltage generation circuit 40 on the secondary side of the fly-back transformer FBT has such a waveform as shown in (h) of FIG. 2. In particular, a waveform is obtained wherein the rectified current Io flows in the form of a sine wave in the direction of the positive polarity within the period TOFF1.

As can be recognized from the foregoing description, according to the power supply circuit of the present embodiment, not only the step-up windings NHV but also the low voltage secondary winding N2 are wound on the fly-back transformer FBT to obtain the dc high voltage EHV and the secondary side dc output voltage E01 on the secondary side of the single fly-back transformer FBT. In other words, the core of the power isolation transformer PIT and the winding as the primary winding N1 are omitted as components.

Consequently, in the present embodiment, the mounting area of the printed circuit board is reduced as much, and further miniaturization and reduction in weight can be anticipated. Further, since the winding as the primary winding N1 is omitted, the time for the winding step in manufacture of the power supply circuit is reduced as much. Consequently, also the efficiency in manufacture is improved.

Further, since the low voltage secondary winding N2 is wound on the fly-back transformer FBT, the sectional area of the core increased when compared with that where it is wound otherwise on the power isolation transformer PIT, and consequently, the number of turns of the secondary winding N2 can be reduced. Also this decreases the time for the wiring step.

Further, according to the structure of the fly-back transformer FBT shown in FIG. 3, as the coupling degree between the primary winding No and the low voltage secondary winding N2, the coupling coefficient k can be reduced to approximately k=0.55 thereby to obtain a sufficiently loose coupling state.

Therefore, the leakage inductance of the low voltage secondary winding N2 increases. Consequently, the capacitance of the secondary side parallel resonance capacitor C2 connected in parallel to the low voltage secondary winding N2 can be reduced. Where the capacitance is low, the part selected for the capacitor may be of a reduced size. Also in this regard, miniaturization and reduction in weight of the circuit can be anticipated.

Further, according to the structure shown in FIG. 3, the windings are wound on the two gaps G1 and G2 through the bobbins. Consequently, leakage fluxes from the gaps are intercepted by the windings. In other words, the problem of leakage fluxes can be eliminated without provision of a shield plate or some other element.

For example, it is assumed that the dc input voltage (Ei) is obtained by voltage doubler rectification under the condition of the AC 100 V system, and a switching element which withstands 1,500 V is used for the switching element Q1 in this instance. If the configuration just described is used, the control amount for the switching frequency may be set to 80 KHz to 85 KHz where the load power variation of the dc high voltage EHV ranges from 68 W to 0 W. Consequently, the control amount only of 5 KHz is required.

In contrast, for example, according to the circuit shown in FIG. 6, where the load power variation of the dc high voltage EHV ranges from 68 W to 0 W, the switching frequency ranges from 80 KHz to 120 KHz, and the control amount of 40 KHz is required.

Where the range of control of the switching frequency with respect to the load variation is reduced in this manner, also the leakage fluxes to be radiated from the fly-back transformer FBT and ripple components to be superposed on the dc high voltage EHV are suppressed. The suppression just described, however, suppresses the beat to appear on the screen of the CRT and therefore eliminates the necessity to particularly take countermeasures for eliminating the beat.

Figure 4:
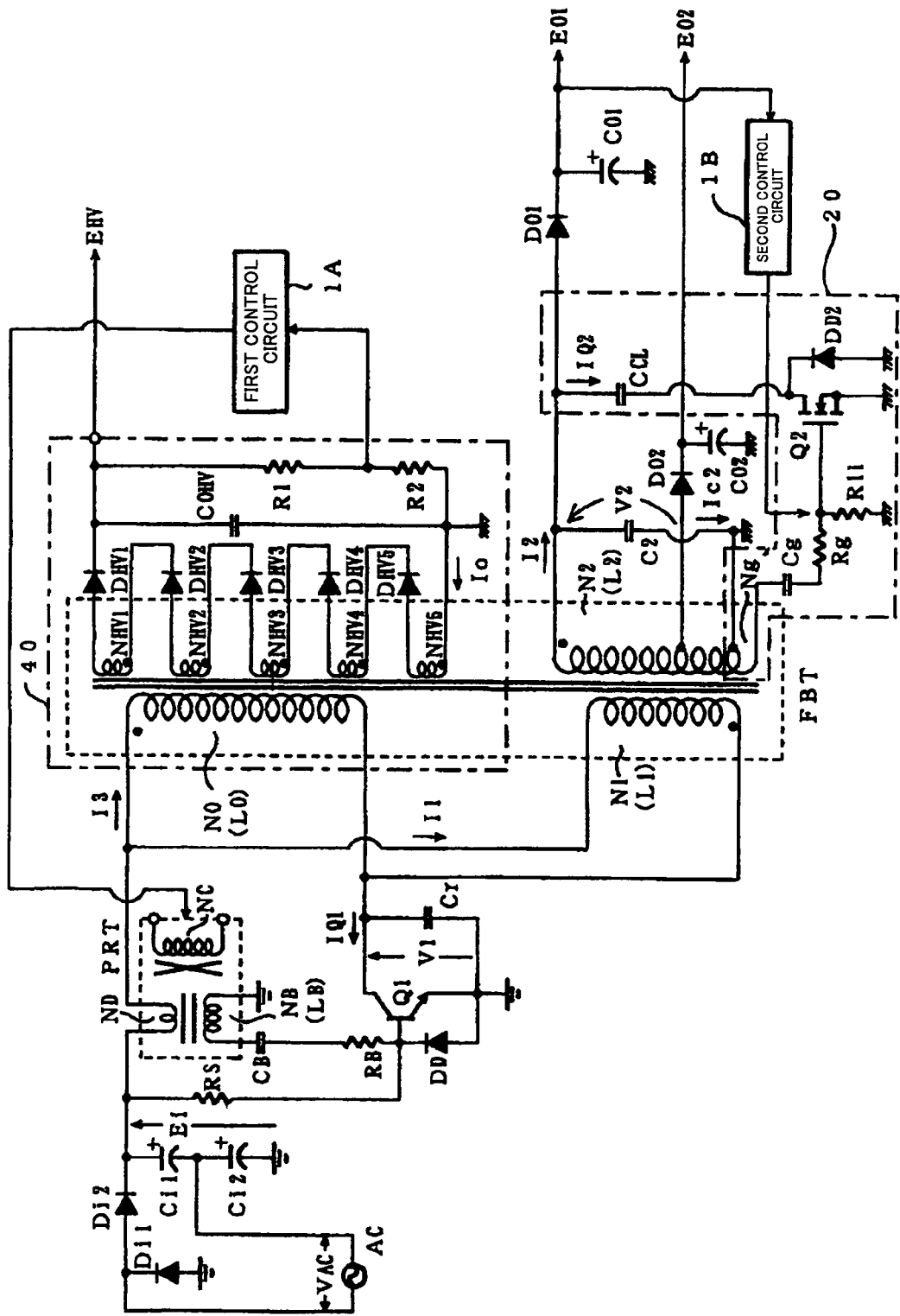
FIG. 4 is a circuit diagram showing an example of a configuration of a switching power supply circuit as a second embodiment of the present invention.

FIG. 4 shows an example of a configuration of another switching power supply circuit as a second embodiment. It is to be noted that, in FIG. 4, like elements to those of FIG. 1 are denoted by like reference characters, and overlapping description of them is omitted herein.

In the power supply circuit shown in FIG. 4, a rectification smoothing circuit for receiving a commercial ac power supply (ac input voltage VAC) as an input thereto to obtain a dc input voltage (rectified smoothed voltage Ei) is formed as a voltage doubler rectification circuit. The voltage doubler rectification circuit includes rectifying diodes Di1 and Di2 and smoothing capacitors Ci1 and Ci2 connected in a connection scheme shown in FIG. 4. In the voltage doubler rectification circuit, a rectified smoothed voltage Ei corresponding to twice the ac input voltage VAC is produced across the series connection of the smoothing capacitors Ci1 and Ci2 and supplied to a primary side voltage resonance type converter.

In the present embodiment, the rectified smoothed voltage Ei corresponding to twice the ac input voltage VAC is obtained in this manner from the following reason. In particular, because it is necessary to obtain the dc high voltage EHV of a required level by means of the high voltage generation circuit 40, a voltage of approximately 1,000 V is required for the peak level of the primary side parallel resonance voltage V1. Therefore, a correspondingly high level is required for the input voltage level to the voltage resonance type converter.

In the power supply circuit shown in FIG. 4, not only the primary winding No for a high voltage but also a low voltage primary winding N1 are provided as primary side windings wound on the fly-back transformer FBT. The low voltage primary winding N1 is connected in parallel to the other primary winding No in such a manner as seen in FIG. 4.

As regards the coupling degrees between the windings in the fly-back transformer FBT in this instance, the primary winding No and the step-up windings NHV have a dense coupling having a coupling coefficient k of k= 0.95 or more similarly as in the case of FIG. 1. Meanwhile, as regards the coupling degree between the low voltage primary winding N1 and the low voltage secondary winding N2, a loose coupling state having a coupling coefficient k of k=approximately 0.71 is obtained so that an operation as a complex resonance type switching converter may be obtained.

Incidentally, as the coupling degree of the low voltage primary winding N1 or the low voltage secondary winding N2 to the primary winding No for a high voltage, the coupling coefficient k is set approximately to k= 0.55. Consequently, the number of turns of the primary winding No can be increased thereby.

With such a configuration as just described, the primary winding No and the step-up windings NHV correspond to each other and the low voltage primary winding N1 and the low voltage secondary winding N2 correspond to each other as the corresponding relationship in power transmission in the fly-back transformer FBT. In particular, an alternating voltage is excited in the step-up windings NHV on the secondary side by the switching output of the primary side obtained from the primary winding No. Meanwhile, an alternating voltage is excited in the low voltage secondary winding N2 by the switching output obtained from the low voltage primary winding N1.

It is to be noted that the rectification operation and the stabilization operation of the secondary side for obtaining a dc high voltage EHV and a low secondary side dc output voltage E0 in the fly-back transformer FBT are similar to those in the power supply circuit shown in FIG. 1. Therefore, operation of them is omitted here.

Figure 5:
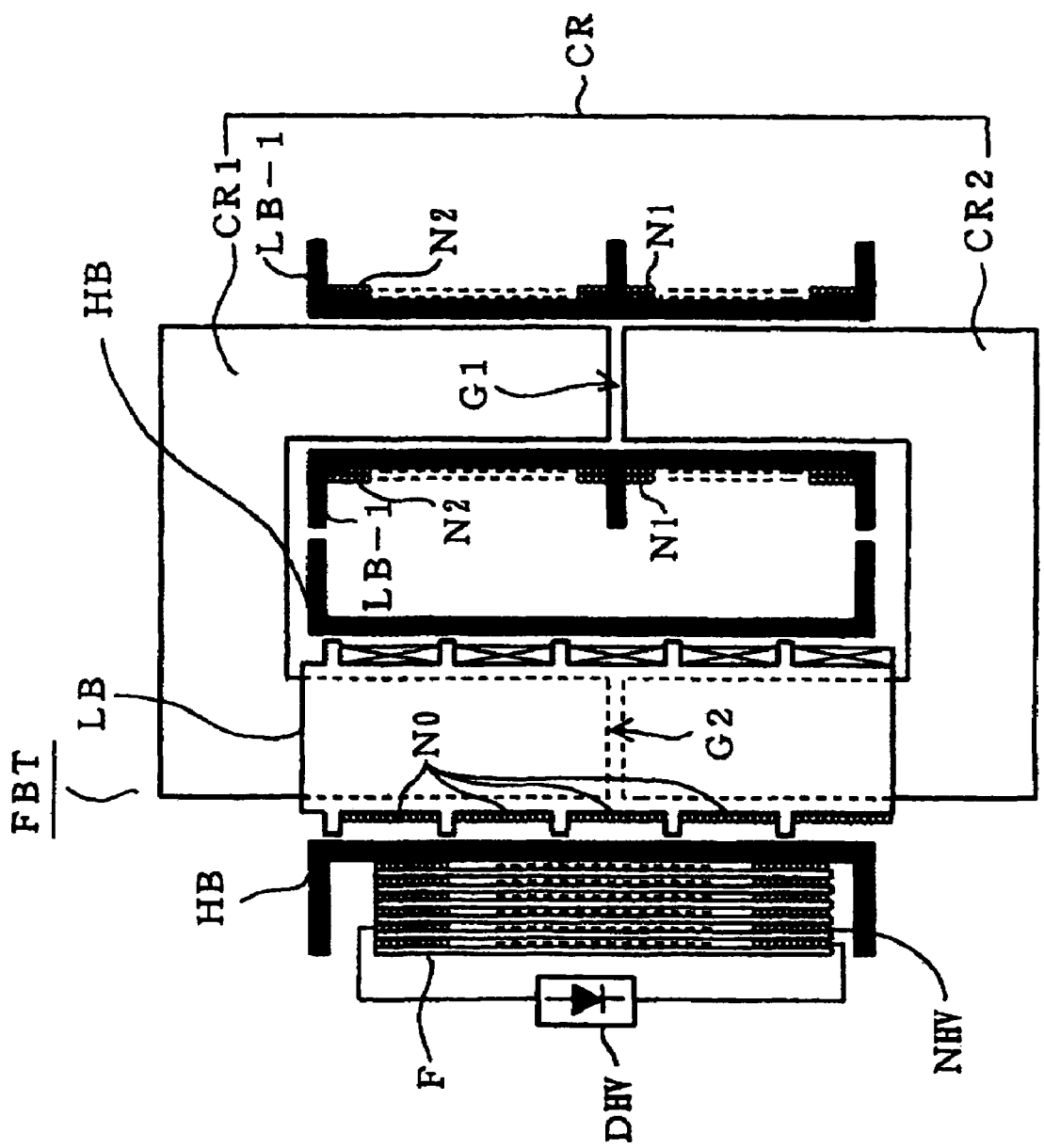
FIG. 5 is a sectional view showing an example of a structure of a fly-back transformer provided in the power supply circuit shown in FIG. 4.

FIG. 5 shows a sectional view of an example of a structure of the fly-back transformer FBT provided in the power supply circuit shown in FIG. 4. It is to be noted that the fly-back transformer FBT shown in FIG. 5 has a basically similar structure to that described hereinabove with reference to FIG. 3 and has the structure shown in FIG. 3 in that the low voltage primary winding N1 is wound thereon. Thus, as description with reference to FIG. 5, only a location where the low voltage primary winding N1 is wound is described.

Also in this instance, on the other magnetic leg on which the primary winding No and the step-up windings NHV1 to NHV5 are not wound, another low voltage winding bobbin LB-1 is mounted such that the magnetic leg extends therethrough.

In this instance, a single partition is provided for the low voltage winding bobbin LB-1 as shown in FIG. 5 so that the low voltage winding bobbin LB-1 is formed as a so-called divisional bobbin whose wound portions for two windings are provided divisionally from each other. Thus, the low voltage primary winding N1 and the low voltage secondary winding N2 are divisionally wound on the different wounding portions of the low voltage winding bobbin LB-1 to secure isolation thereof from each other.

As the windings are wound in such a manner as shown in FIG. 5, such coupling degrees as described above can be obtained among the windings.

It is to be noted that, also in this instance, the driving winding Ng formed on the low voltage secondary winding N2 side is omitted for the convenience of illustration. Further, also in the present embodiment, the fly-back transformer FBT may have another basic structure based on slit winding while the low voltage primary winding N1 and the low voltage secondary winding N2 are wound as seen in FIG. 5 in a similar manner as in the case of the preceding embodiment.

Here, specifications of major parts selected from within the power supply circuit as the second embodiment shown in FIG. 4 are indicated in comparison with those of the power supply circuit described hereinabove as a prior art apparatus with reference to FIG. 6.

In the power isolation transformer PIT in the circuit shown in FIG. 6, an EE-type core called EE-40 type was used wherein the gap length=1 mm, the primary winding N1=130 T, and the secondary winding N2=100 T. Meanwhile, in the fly-back transformer FBT, the gap length=0.4 mm×2, the primary winding No=70 T, and the step-up windings NHV1 to NHV5=530 T.

Further, the primary side parallel resonance capacitor Cr=2,200 pF, the clamp capacitor CCL=0.22 F, and the secondary side series resonance capacitor C2= 3,300 pF were selected. Further, the control range of the switching frequency was set to 70 KHz to 80 KHz.

In contrast, in the power supply circuit as the second embodiment shown in FIG. 4, the core of the power isolation transformer PIT is omitted.

Further, as regards the fly-back transformer FBT, the primary winding No for a high voltage is No=80 T; the low voltage primary winding N1 is N1=100 T; the low voltage secondary winding N2 is N2=70 T; and the step-up windings NHV are NHV=530 T.

Further, as regards the part elements, the primary side parallel resonance capacitor Cr is selectively set to Cr=4,700 pF, the clamp capacitor CCL to CCL=0.22 m, the secondary side parallel resonance capacitor C2 to C2=3,300 pF; and the control range of the switching frequency to 70 KHz to 80 KHz. Thus, the specifications of the part elements are similar to those of the circuit shown in FIG. 6.

As can be recognized from the foregoing description, also in the power supply circuit of the second embodiment shown in FIG. 4, the core of the power isolation transformer PIT is omitted as a component. Accordingly, also in this instance, the mounting area of the printed circuit board is reduced as much, and further miniaturization and reduction in weight can be anticipated.

Further, according to the structure of the fly-back transformer FBT in the present embodiment, the winding areas of the low voltage primary winding N1 and the low voltage secondary winding N2 increase. Therefore, while, for example, the circuit shown in FIG. 6 uses a Litz wire of 60 m$\phi$/80 bundles for the windings mentioned, the present embodiment can use another Litz line having a greater number of bundles such as, for example, 60 m$\phi$/130 bundles. Therefore, the power loss by copper loss is reduced and the power conversion efficiency is improved. More particularly, while the AC/DC power conversion efficiency of the circuit shown in FIG. 6 is 90.1%, the circuit of the present embodiment shown in FIG. 4 exhibits an AC/DC power conversion efficiency improved up to 91.0%. Further, the ac input power is reduced by 2.4 W.

It is to be noted that, in the present embodiment, the orthogonal control transformer PRT is used as a control transformer for performing fixed voltage control under a configuration wherein a self-excited resonance converter is provided for the primary side. However, an oblique control transformer proposed formerly by the assignee of the present application can be adopted in place of the orthogonal control transformer PRT.

In a structure of the oblique control transformer, though not shown, two cores having four magnetic legs are combined to form a solid core similarly as in the case of, for example, an orthogonal control transformer. Then, the control winding NC and the driving winding NB are wound on the solid core. In this instance, the control winding and the driving winding are wound such that the winding directions of them have an obliquely intersecting relationship to each other. More particularly, one of the control winding NC and the drive winding NB is wound on two ones of the four magnetic legs which have a positional relationship of neighboring with each other. Meanwhile, the other winding is wound on those two magnetic legs which have a diagonal positional relationship to each other.

Where such an oblique control transformer as just described is used, an operation tendency is obtained that, even when the level of the ac current flowing through the driving winding changes from a negative current level to a positive current level, the inductance of the driving winding increases. Consequently, the level of the current in the negative direction for turning off the switching element increases to decrease the storage time of the switching element. This decreases the fall time upon turning off of the switching element. Consequently, the power loss of the switching element can be further reduced.

Further, for example, the embodiments described above adopt a bipolar transistor for the main switching element and the auxiliary switching element. However, it is otherwise possible to adopt some other element such as a MOS-FET or an IGBT. Where a MOS-FET or an IGBT is adopted, for example, an oscillation driving circuit for which, for example, an IC for universal use is used may be used such that externally excited switching driving may be performed.

Furthermore, the embodiments described above adopt, for example, a self-excited resonance converter for the resonance converters. However, a separately excited resonance converter may be adopted instead. Further, while the resonance converters are formed as a voltage resonance circuit which includes a switching element Q1 on the primary side, they may otherwise be formed as a current resonance converter of the so-called push-pull type which includes two switching elements.

What is claimed is:

1. A switching power supply circuit, comprising:

switching means including a main switching element for interrupting and outputting a direct current input voltage fed to said switching means;

a high-voltage generating transformer including a primary winding and a plurality of secondary windings wound on one magnetic leg of a solid core having two magnetic legs each formed with a gap of a predetermined distance to form a closed magnetic path and a secondary low-voltage winding on the other of said two magnetic legs of said solid core, wherein said primary winding and said plurality of secondary windings are coupled in a closely coupled state, and said primary winding and said secondary low-voltage winding are coupled in a loose coupling state;

a primary capacitor for cooperating with said primary winding of said high-voltage generating transformer to form a primary resonance circuit;

direct current low-voltage production means for rectifying an alternating voltage obtained from said secondary low-voltage winding to obtain a direct current low-voltage;

direct current high-voltage production means having a plurality of diodes corresponding respectively to said plurality of secondary windings each for rectifying a high voltage obtained by said plurality of secondary windings and each for stepping up the rectified voltage to obtain a direct current high voltage; and fixed-voltage control means for performing frequency control of said main switching element in response to a level of the voltage produced by said direct current high-voltage production means to perform fixed voltage control.

2. The switching power supply circuit according to claim 1, further comprising second fixed-voltage control means for performing fixed-voltage control in response to a level of the voltage produced by said direct current low-voltage production means.

3. The switching power supply circuit according to claim 1, further comprising a secondary parallel resonance circuit formed from a secondary parallel resonance capacitor connected in parallel with said secondary side low-voltage winding.

4. A switching power supply circuit, comprising:
switching means including a main switching element for interrupting and outputting a direct current input voltage fed to said switching means;
a high-voltage generating transformer including a solid core formed from a pair of U-shaped magnetic members and coupled to each other so as to form two magnetic legs with gaps between said pair of U-shaped magnetic members to form a closed magnetic path, a primary winding wound on one of said two magnetic legs, a plurality of secondary windings wound coaxially with said primary winding, and a secondary low-voltage winding wound on the other of said two magnetic legs forming said solid core, wherein said primary winding and said plurality of secondary windings are coupled in a closely coupled state, and said primary winding and said secondary low-voltage winding are coupled in a loose coupling state;
a primary resonance capacitor for cooperating with said primary winding of said high-voltage generating transformer to form a primary resonance circuit;
direct current low-voltage production means for rectifying an alternating voltage obtained from said secondary low-voltage winding to obtain a direct current low voltage;
direct current high-voltage production means having a plurality of diodes corresponding respectively to said plurality of secondary windings each for rectifying a high voltage obtained by said plurality of secondary windings and each for stepping up the rectified voltage to obtain a direct current high-voltage; and
fixed-voltage control means for performing frequency control of said main switching element in response to a level of a voltage produced by said direct current high-voltage production means to perform fixed-voltage control.

5. The switching power supply circuit according to claim 4, wherein said primary winding comprises a first primary winding and said high-voltage generating transformer further includes a second primary winding wound so as to have a predetermined coupling degree whereby a loose coupling is provided with said secondary low-voltage winding wound on said the other of said two magnetic legs and connected in parallel with said first primary winding.

6. The switching power supply circuit according to claim 4 or 5, wherein said fixed-voltage control means includes a detection winding for detecting resonance current with which said primary resonance circuit resonates, a driving winding for driving said main switching element, and an orthogonal transformer for receiving a control current that varies in response to the level of the secondary direct current output voltage to vary an inductance of said driving winding, and wherein the switching frequency of said main switching element is variably controlled.

7. The switching power supply circuit according to claim 4, wherein said fixed-voltage control means comprises first fixed-voltage control means and further comprising second fixed-voltage control means for performing fixed voltage control in response to a level of a voltage produced by said direct current low-voltage production means.

8. The switching power supply circuit according to claim 7, wherein said second fixed-voltage control means includes active clamp means including a series connection circuit formed of a clamp capacitor and an auxiliary switching element connected in parallel with said secondary parallel resonance circuit, continuity angle control of said auxiliary switching element being performed in response to a level of the voltage produced by said direct current low-voltage production means to perform fixed-voltage control.

9. The switching power supply circuit according to claim 4, further comprising a secondary parallel resonance circuit formed from a secondary parallel resonance capacitor connected in parallel with said secondary low-voltage winding.

* * * * *